(12) United States Patent
Goulet et al.

(10) Patent No.: US 11,864,610 B2
(45) Date of Patent: Jan. 9, 2024

(54) MULTILAYER LATTICE PROTECTIVE EQUIPMENT

(71) Applicant: XENITH, LLC, Detroit, MI (US)

(72) Inventors: Grant C. Goulet, Detroit, MI (US); Connor T. Riegle, Dearborn Heights, MI (US); Ronald Arthur Jadischke, Kingsville (CA)

(73) Assignee: Xenith, LLC, Detroit, MI (US)

( * ) Notice: Subject to any disclaimer, the term of this patent is extended or adjusted under 35 U.S.C. 154(b) by 87 days.

(21) Appl. No.: 16/690,763

(22) Filed: Nov. 21, 2019

(65) Prior Publication Data
US 2020/0154803 A1 May 21, 2020

Related U.S. Application Data

(60) Provisional application No. 62/770,511, filed on Nov. 21, 2018.

(51) Int. Cl.
*A41D 31/28* (2019.01)
*B32B 3/12* (2006.01)
*A63B 71/12* (2006.01)
*B32B 5/18* (2006.01)

(52) U.S. Cl.
CPC ............ *A41D 31/285* (2019.02); *A63B 71/12* (2013.01); *B32B 3/12* (2013.01); *B32B 5/18* (2013.01); *B32B 2307/56* (2013.01); *B32B 2571/00* (2013.01)

(58) Field of Classification Search
CPC ........... A42B 3/003; A42B 3/06; A42B 3/062; A42B 3/063; A42B 3/068; A42B 3/12; A42B 3/128
See application file for complete search history.

(56) References Cited

U.S. PATENT DOCUMENTS

| | | | | |
|---|---|---|---|---|
| 3,447,163 A | * | 6/1969 | Tojeiro | A42B 3/065 2/412 |
| 3,591,863 A | * | 7/1971 | Rickard | A42B 3/085 2/415 |
| 3,617,416 A | * | 11/1971 | Kromrey | B31D 3/0207 156/173 |
| 4,599,752 A | * | 7/1986 | Mitchell | A42B 3/003 2/422 |

(Continued)

FOREIGN PATENT DOCUMENTS

WO 2020106934 A1 5/2020

OTHER PUBLICATIONS

International Search Report from related PCT Application PCT/US19/62565 dated Feb. 4, 2020 11 pages.

*Primary Examiner* — Sally Haden
(74) *Attorney, Agent, or Firm* — Kilpatrick Townsend & Stockton LLP (57) ABSTRACT

An article of protective equipment for protecting a body part of a user includes a lattice structure with a plurality of struts forming three dimensional volumetric structures. The lattice structure includes a plurality of internal layers, each internal layer having at least one different physical property from the other internal layers, wherein the plurality of internal layers comprises at least one internal layer having physical properties such that the at least one internal layer is capable of compressing more than at least one other internal layer in response to an impact to the article of protective equipment.

13 Claims, 10 Drawing Sheets

(56) References Cited

U.S. PATENT DOCUMENTS

| | | |
|---|---|---|
| 9,839,251 B2 | 12/2017 | Pannikottu et al. |
| 10,780,338 B1 | 9/2020 | Bologna et al. |
| 11,213,736 B2 | 1/2022 | Bologna et al. |
| 2014/0259326 A1* | 9/2014 | Carlson ................ A41D 13/015 2/455 |
| 2016/0160952 A1* | 6/2016 | Schaedler .............. B60N 3/048 188/377 |
| 2018/0027914 A1* | 2/2018 | Cook ....................... A42B 3/12 |
| 2018/0058531 A1* | 3/2018 | Schaedler ............. B32B 27/302 |
| 2018/0168267 A1* | 6/2018 | Giles ...................... A42B 3/063 |
| 2018/0264718 A1* | 9/2018 | McCluskey ............. B29C 35/02 |
| 2020/0022444 A1* | 1/2020 | Stone ..................... A42B 3/062 |
| 2020/0100554 A1 | 4/2020 | Bologna et al. |
| 2020/0215415 A1 | 9/2020 | Boolgna et al. |
| 2021/0001207 A1 | 1/2021 | Bologna et al. |

\* cited by examiner

MULTILAYER LATTICE PROTECTIVE EQUIPMENT

CROSS-REFERENCE TO RELATED APPLICATIONS

This application claims priority to U.S. Provisional Patent Application No. 62/770,511, filed Nov. 21, 2018, entitled "MULTILAYER LATTICE PROTECTIVE EQUIPMENT," the disclosure of which is hereby incorporated by reference in its entirety for all purposes.

RELATED FIELDS

This disclosure relates to protective equipment for sports or other activities.

BACKGROUND

In many instances, people participating in some activities that may be associated with a risk of bodily injury, such as athletes, first responders, construction site workers, motorcycle/bicycle riders, and military service members, use protective equipment to absorb, distribute, and otherwise reduce the effects of impacts to the user's body. Many examples of protective equipment use conventional materials having constant cross-section and minimal layers.

The importance of protective equipment is rapidly increasing as more research is conducted related to head traumas and concussions, which may lead to chronic traumatic encephalopathy (CTE). Protective equipment can also reduce the likelihood of injuries (such as sprains, broken bones, or various other potential injuries).

In certain situations, it may be desirable to design protective equipment with customized layers of materials having varying properties designed for specific portions of a user's body based on anatomical traits to maximize safety for the user while simultaneously optimizing weight and breathability.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments, an article of protective equipment for protecting a body part of a user includes: a lattice structure including a plurality of struts forming three dimensional volumetric structures, the lattice structure including: at least two layers, each having at least one different physical property; and an internal layer having physical properties such that the internal layer compresses more than at least one other layer in response to an impact to the article of protective equipment.

In some embodiments, the article of protective equipment may include a lattice structure having a plurality of struts forming three dimensional volumetric structures. The lattice structure may include a plurality of internal layers, each internal layer having at least one different physical property from the other internal layers. The plurality of internal layers may include at least one internal layer having physical properties such that the at least one internal layer is capable of compressing more than at least one other internal layer in response to an impact to the article of protective equipment.

In some embodiments, the lattice structure further includes an integral comfort layer disposed on a proximal side of the lattice structure that is closest to the body part when worn. The lattice structure may include an internal shell disposed on an outer surface of at least a portion of the integral comfort layer. In some embodiments, the lattice structure includes a first internal layer attached to at least a portion of an outer surface of the internal shell, a second internal layer attached to at least a portion of an outer surface of the first internal layer, and a third internal layer attached to at least a portion of an outer surface of the second internal layer. In some embodiments, the third internal layer includes a lower density portion adjacent to the second internal layer and a higher density portion distal from the second internal layer.

In some embodiments, the lattice structure further includes an integral shell as an outermost surface of the lattice structure. In some embodiments, an outermost surface of the lattice structure includes at least one first attachment portion for attaching a rigid shell. In some embodiments, the rigid shell is removably attached to the lattice structure. In some embodiments, the rigid shell includes multiple separate portions.

In some embodiments, the article of protective equipment includes a helmet, wherein a thickness of at least one of the internal layers is increased in an area corresponding to an occipital bone of the user when worn. In some embodiments, the lattice structure includes at least one of a linear energy absorption layer or a rotational energy absorption layer.

In some embodiments, the lattice structure includes a first set of volumetric structures disposed in a first orientation such that the first set of volumetric structures is configured to deflect a first force from a first direction to a second direction; and a second set of volumetric structures adjacent to the first set of volumetric structures, wherein the second set of volumetric structures is disposed in a second orientation different from the first orientation such that the second set of volumetric structures is configured to deflect a second force from a third direction to a fourth direction.

In some embodiments, an article of protective equipment for protecting a body part of a user includes a lattice structure including a plurality of struts forming volumetric structures. The lattice structure may include a plurality of internal layers, each internal layer having at least one different property. The plurality of internal layers may include at least one internal layer including struts having a first diameter such that the at least one internal layer is capable of compressing more than at least one other internal layer in response to an impact to the article of protective equipment.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

FIGS. 1A-9C illustrate exemplary embodiments of articles of protective equipment 10 for a user 1. As described in greater detail below, the protective equipment 10 may be specifically designed or adapted based on the desired activities expected for the user 1, specific anatomical traits of the individual user 1, optimized for protecting specific body parts of the user 1, and/or further adapted for protection as desired based on any other relevant factor. The user 1 may be engaged in activities associated with first responders, military service members, athletes, or any other potentially relevant activity. For athletes, the protective equipment 10 may be specifically designed, for example, for full contact football, hockey, baseball, soccer, basketball, softball, lacrosse, cycling, shooting sports, rugby, boxing, mixed martial arts, cricket, touch football, flag football, 7 on 7 football, motorsports, or any other sporting activity where protective equipment is appropriate. To optimize the protective equipment 10 for specific anatomical traits of the individual user 1, the protective equipment 10 may be manufactured and/or modified based on physical measurements, photographs, three dimensional scans of the user 1, molds or the user's anatomy or any other appropriate criteria. With respect to specific body parts of the user 1, the protective equipment 10 may be specifically designed, for example, for protecting the head, shoulders, chest, back, arms, elbows, hands, ribs, hip, tailbone, legs, thighs, knees, shins, and/or any other relevant body part. Moreover, the protective equipment 10 may also be designed and/or optimized for a particular task or role. For example, for football players, different playing positions result in different typical loading conditions and resultant equipment requirements, such that a quarterback, an offensive lineman, a cornerback, and a linebacker (among others) would each include different objectives and may necessitate and result in different protective equipment 10 for each position. In addition, the various components and layers of the protective equipment 10 may be designed, optimized, or modified to adjust the weight distribution and center of mass. For example, optimizing the location of the center of mass for a helmet or other headgear (e.g., see FIGS. 5A-6B) may reduce the forces and resultant torque on the head/neck of a user 1 thus reducing the likelihood of injury.

Some or all of the components of the protective equipment 10 may be produced by additive manufacturing including, for example, 3D printing, rapid prototyping, direct digital manufacturing, layered manufacturing, additive fabrication, etc. The components of the protective equipment 10 may include at least one of resin, polyurethane, silicone, cyanate ester, epoxy, urethane methacrylate, polymers, thermoplastic, metallic materials, or any other appropriate material. The material(s) of the protective equipment 10 may be elastomeric or rigid.

In some embodiments, the lattice structure 100 includes three dimensional volumetric structures with struts that form shapes including, but not limited to, Voronoi, tetrahedral, rhombic, hexagonal, dode, or any other appropriate shape. The structures (or cells) can be scaled uniformly, non-uniformly, and/or may be rotated. The thickness/diameter of the struts may vary throughout the lattice structure 100. The overall density for a specific portion of the lattice structure 100 depends on at least (i) the thickness/diameter of the struts and (ii) the size of the volumetric structure (i.e., the amount of empty space). For some portions of the protective equipment 10, the lattice structure 100 may include two dimensional surface structures.

In some embodiments, as shown in FIGS. 1A-1F, the protective equipment 10 includes a lattice structure 100 extending between a proximal side P (closer to the skin of the user 1) and a distal side D. The various layers of the lattice structure 100 may be designed for specific function(s) based on various differences between the layers. The one or more layers of the lattice structure 100 may include different functions and different physical properties. The physical properties may include, for example, density, strut thickness, strut diameter, cell geometry, cell size, cell orientation, layer thickness, material, or any other relevant parameter.

Figure 1A:
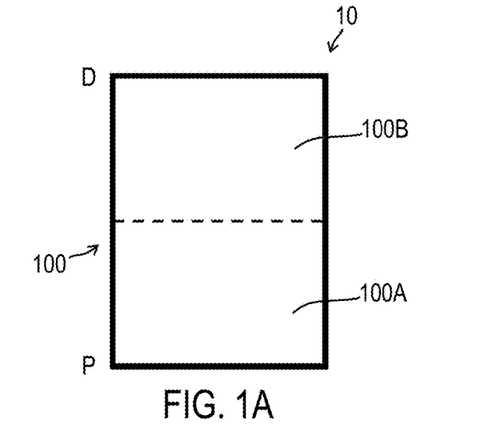
FIG. 1A is a schematic cross-section view of a lattice structure for protective equipment according to certain embodiments of the present invention.

FIG. 1A shows an example of protective equipment 10 that includes lattice structure 100 with a first energy absorption layer 100A and a second energy absorption layer 100B. Various properties of the energy absorption layers may be rate-dependent. The first energy absorption layer 100A may be designed (i.e., based on one or more of the factors described above) to absorb energy associated with linear accelerations (e.g., an acceleration from the distal side D toward the proximal side P). The second energy absorption layer 100B may be designed to absorb energy associated with rotational accelerations (e.g., an acceleration that is approximately perpendicular to a linear acceleration). In some cases, the rotational acceleration may result in shear loads on the lattice structure 100. Although the first energy absorption layer 100A and the second energy absorption layer 100B are illustrated as approximately equal in thickness, these two layers may have any relative thickness. In addition, although the first energy absorption layer 100A (e.g., a linear acceleration layer) is shown closer to the proximal side P and the second energy absorption layer 100B (e.g., a rotational acceleration layer) is shown closer to the distal side D, in some cases, these locations may be reversed such that the first energy absorption layer 100A is closer to the distal side D and the second energy absorption layer 100B is closer to the proximal side P. The lattice structure 100 in FIG. 1A may be appropriate for multiple applications including, for example, the internal layers of headgear for full contact football. In some cases, the lattice structure 100 of FIG. 1A may be attached to an interior side of a traditional outer shell of a helmet (e.g., semi-rigid or rigid shell 201, described below) and/or may be attached to an outer side of traditional foam padding (e.g., foam pad 51, described below) for a headgear configuration.

Figure 1B:
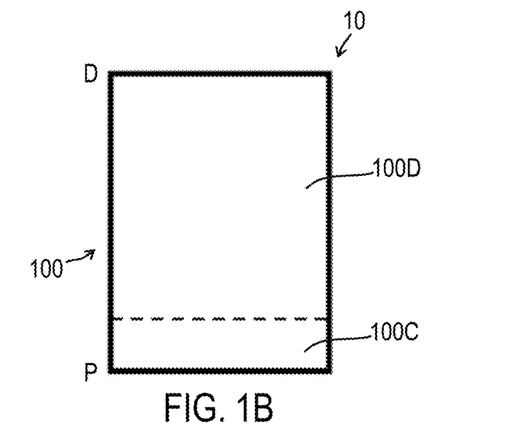
FIG. 1B is a schematic cross-section view of a lattice structure for protective equipment according to certain embodiments of the present invention.

The example shown in FIG. 1B includes lattice structure 100 with a comfort fit layer 100C on the proximal side P and an energy absorption layer 100D on the distal side D. In some embodiments, the comfort fit layer 100C is a flexible compliant layer that adapts to the surface of the user's skin. In some cases, the comfort fit layer 100C is similar to the integral comfort layer 102 described below. The energy absorption layer 100D may function similar to one or both of the first energy absorption layer 100A and/or the second energy absorption layer 100B (described above in the context of FIG. 1A). Although the energy absorption layer 100D is illustrated as much thicker than the comfort fit layer 100C, in some examples, the energy absorption layer 100D is approximately equal to or thinner than the comfort fit layer 100C. The lattice structure 100 in FIG. 1B may be appropriate for multiple applications including, for example, headgear where direct impacts to the protective equipment 10 are less frequent, such as non-contact football or soccer. In some cases, the lattice structure 100 of FIG. 1B may be attached to one or more separate textile layers for a headgear configuration.

Figure 1C:
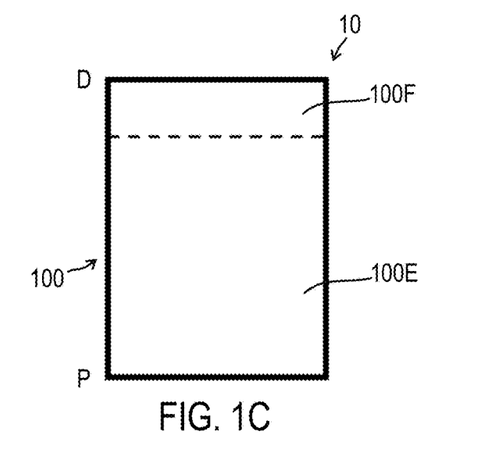
FIG. 1C is a schematic cross-section view of a lattice structure for protective equipment according to certain embodiments of the present invention.

FIG. 1C shows an example of lattice structure 100 that includes an energy absorption layer 100E on the proximal side P and a load distribution layer 100F on the distal side D. In some embodiments, the load distribution layer 100F is a layer that dissipates and distributes energy to reduce localized effects due to impacts such that point impacts are spread across large portions of the protective equipment 10. In some cases, the load distribution layer 100F is similar to the integral shell 110 described below. The energy absorption layer 100E may function similar to one or both of the first energy absorption layer 100A and/or the second energy absorption layer 100B (described above in the context of FIG. 1A). Although the energy absorption layer 100E is illustrated as much thicker than the load distribution layer 100F, in some examples, the energy absorption layer 100E is approximately equal to or thinner than the load distribution layer 100F. The lattice structure 100 in FIG. 1C may be appropriate for multiple applications including, for example, equipment designed specifically for direct impacts, such as a shin guard for soccer.

Figure 1D:
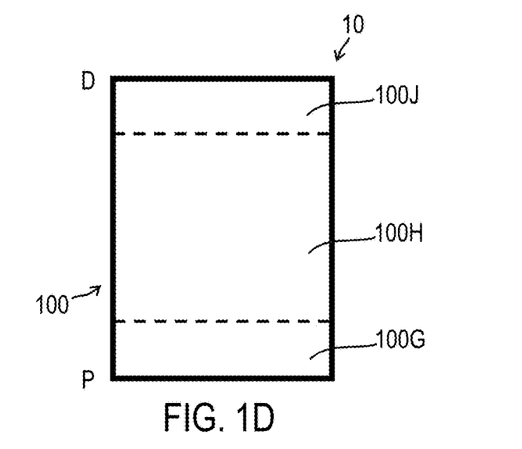
FIG. 1D is a schematic cross-section view of a lattice structure for protective equipment according to certain embodiments of the present invention.

The example shown in FIG. 1D includes lattice structure 100 with a comfort fit layer 100G on the proximal side P, an internal energy absorption layer 100H, and a load distribution layer 100J on the distal side D. The load distribution layer 100J may function in a similar manner as load distribution layer 100F, as described above. The energy absorption layer 100H may function in a similar manner as energy absorption layer 100D or energy absorption layer 100E, as described above. The comfort fit layer 100G may function in a similar manner as comfort fit layer 100C, as described above. Although comfort fit layer 100G and load distribution layer 100J are illustrated as approximately equal thickness and thinner than energy absorption layer 100H, the comfort fit layer 100G and load distribution layer 100J may have different thicknesses and one or both of these layers may be thicker than energy absorption layer 100H. The lattice structure 100 in FIG. 1D may be appropriate for multiple applications including, for example, equipment designed for direct impacts and for maximizing comfort, such as headgear for full contact football.

Figure 1E:
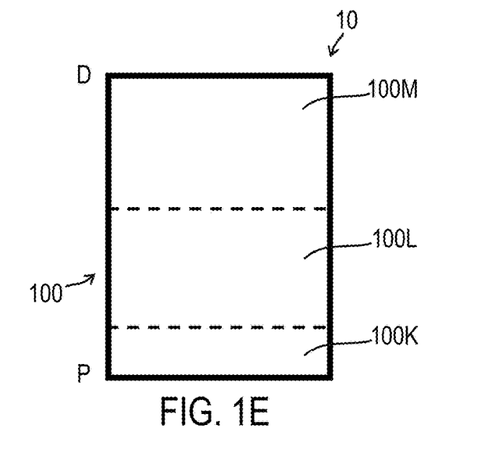
FIG. 1E is a schematic cross-section view of a lattice structure for protective equipment according to certain embodiments of the present invention.

FIG. 1E shows an example of lattice structure 100 that includes a comfort fit layer 100K on the proximal side P, an internal first energy absorption layer 100L, and a second energy absorption layer 100M on the distal side D. The internal first energy absorption layer 100L and the second energy absorption layer 100M may function in a similar manner as first energy absorption layer 100A and second energy absorption layer 100B, respectively (as described above). The comfort fit layer 100K may function in a similar manner as comfort fit layer 100C or comfort fit layer 100G, as described above. The lattice structure 100 in FIG. 1E may be appropriate for multiple applications including, for example, headgear where direct impacts to the protective equipment 10 are less frequent, such as non-contact football or soccer.

Figure 1F:
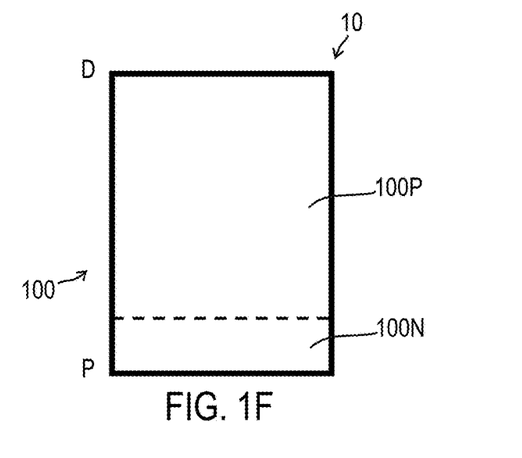
FIG. 1F is a schematic cross-section view of a lattice structure for protective equipment according to certain embodiments of the present invention.

The example shown in FIG. 1F includes lattice structure 100 with a pressure distribution layer 100N on the proximal side P and an energy absorption layer 100P on the distal side D. The energy absorption layer 100P may function similar to one or both of the first energy absorption layer 100A and/or the second energy absorption layer 100B (described above in the context of FIG. 1A). The pressure distribution layer 100N may distribute forces/energy that propagate through the various layers of the lattice structure 100 from the distal side D toward the proximal side P such that the forces/energy are not directly transmitted into small areas of user's skin. The pressure distribution layer 100N may function as a rigid liner. In some cases, the pressure distribution layer 100N is similar to the internal shell 103 described below. The lattice structure 100 in FIG. 1F may be appropriate for multiple applications including, for example, padding (including non-headgear padding) for contact sports, such as football.

Figure 1G:
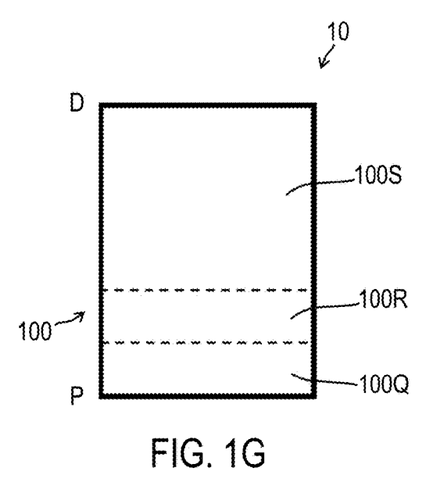
FIG. 1G is a schematic cross-section view of a lattice structure for protective equipment according to certain embodiments of the present invention.

FIG. 1G shows an example of lattice structure 100 that includes a comfort fit layer 100Q on the proximal side P, a pressure distribution layer 100R, and an energy absorption layer 100S on the distal side D. The comfort fit layer 100Q may function in a similar manner as comfort fit layer 100C, comfort fit layer 100G, or comfort fit layer 100K, as described above. The pressure distribution layer 100R may function in a similar manner as pressure distribution layer 100N, as described above. The energy absorption layer 100S may function similar to one or both of the first energy absorption layer 100A and/or the second energy absorption layer 100B (described above in the context of FIG. 1A). The lattice structure 100 in FIG. 1G may be appropriate for multiple applications including, for example, headgear for full contact football. In some cases, the lattice structure 100 of FIG. 1G may be attached to an interior side of a traditional outer shell of a helmet (e.g., semi-rigid or rigid shell 201, described below) for a headgear configuration.

Figure 1H:
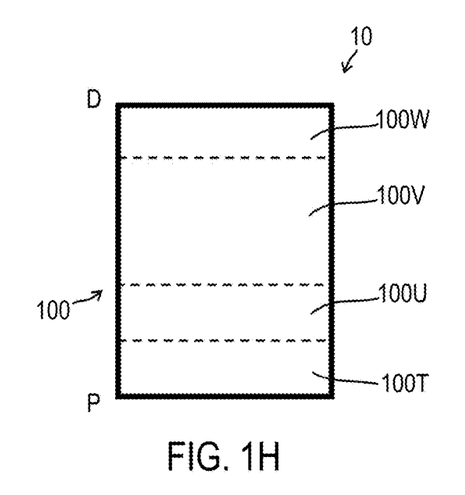
FIG. 1H is a schematic cross-section view of a lattice structure for protective equipment according to certain embodiments of the present invention.

The example shown in FIG. 1H includes lattice structure 100 with a comfort fit layer 100T on the proximal side P, a pressure distribution layer 100U, an energy absorption layer 100V, and a load distribution layer 100W on the distal side D. The comfort fit layer 100T may function in a similar manner as comfort fit layer 100C, comfort fit layer 100G, comfort fit layer 100K, or comfort fit layer 100Q, as described above. The pressure distribution layer 100U may function in a similar manner as pressure distribution layer 100N or pressure distribution layer 100R, as described above. The energy absorption layer 100V may function similar to one or both of the first energy absorption layer 100A and/or the second energy absorption layer 100B (described above in the context of FIG. 1A). The load distribution layer 100W may function in a similar manner as load distribution layer 100F or load distribution layer 100J, as described above. The lattice structure 100 in FIG. 1H may be appropriate for multiple applications including, for example, headgear for full contact football.

In some cases, particular portions of the lattice structure 100 may be oriented to direct force in desired ways, for example, so as to deflect or distribute force effectively. For example, in a particular area of the lattice structure 100 that is known to be subjected to forces along a first direction perpendicular to the user 1, cells (or volumetric structures) of one or more layers of the lattice structure 100 may be oriented such that the forces are deflected away (e.g., in a second direction parallel to the user 1) to make them sheer forces. As another example, cells of one or more layers of the lattice structure may be oriented such that rotational forces are transduced into sheer forces. In some examples, a first set of cells may be disposed in a first orientation such that the first set of volumetric structures is configured to deflect a force from a first direction to a second direction. A second set of volumetric structures (e.g., near to or adjacent to the first set of volumetric structures) may be disposed in a second orientation different from the first orientation such that the second set of volumetric structures is configured to deflect a force from a third direction (which may be different from the first direction) to a fourth direction (which may be different from the second direction).

While FIGS. 1A-1H illustrate various configurations, it should be understood that the layers described herein may be reconfigured, combined, duplicated, rearranged, etc., into other configurations based on desired loading conditions and energy dissipation.

Figure 2A:
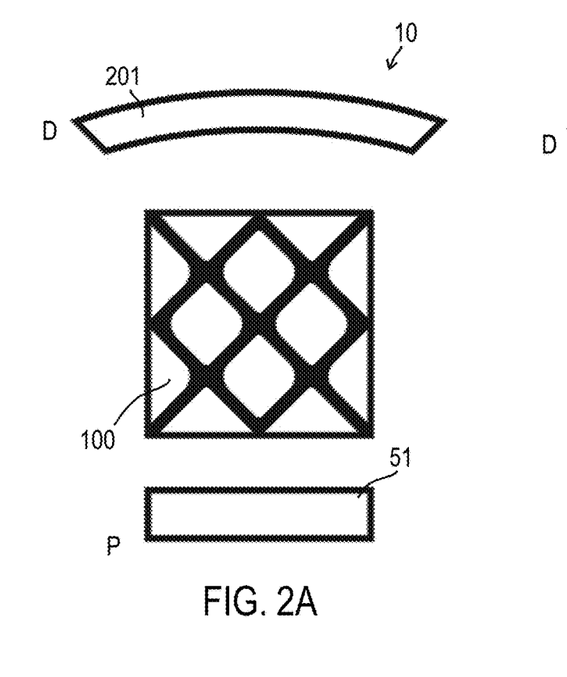
FIG. 2A is a schematic cross-section view of protective equipment according to certain embodiments of the present invention.
Figure 2B:
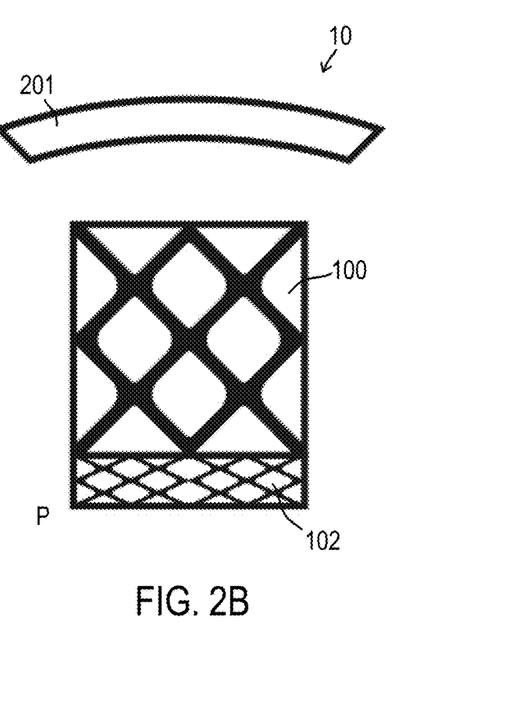
FIG. 2B is a schematic cross-section view of protective equipment according to certain embodiments of the present invention.
Figure 2C:
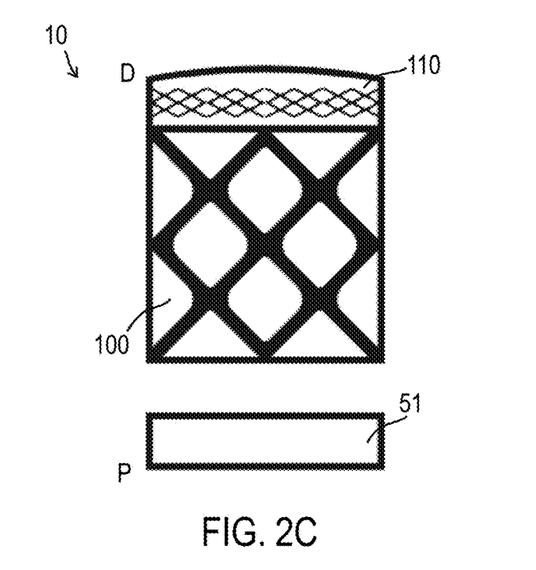
FIG. 2C is a schematic cross-section view of protective equipment according to certain embodiments of the present invention.
Figure 2D:
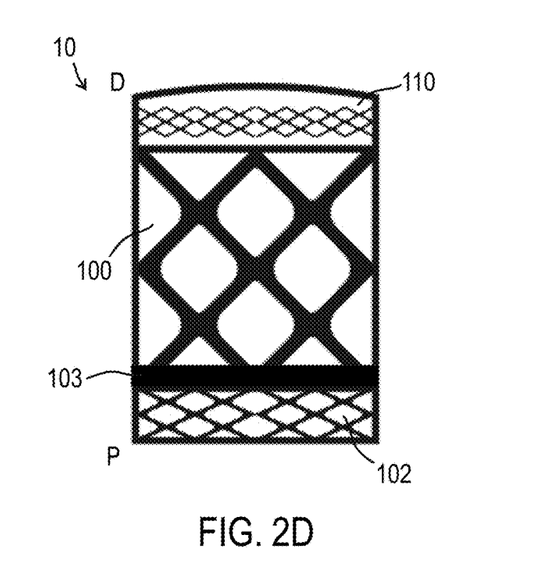
FIG. 2D is a schematic cross-section view of protective equipment according to certain embodiments of the present invention.

FIGS. 2A-2D show four non-limiting examples for multilayer protective equipment 10. In some embodiments, as shown in FIG. 2A, the protective equipment 10 includes a semi-rigid or rigid shell 201, a lattice structure 100, and a foam pad 51. As described in greater detail below, the lattice structure 100 may include multiple layers. The discussions of layers herein may refer to objects constructed from discrete stacked layers and/or to single structures having varying physical properties (including, for example, density, strut thickness, cell geometry, cell size, cell orientation, material, etc.) through their thickness such that transitions between the varying properties are referred to as transitions between layers. In certain embodiments, as shown in FIG. 2B, the protective equipment 10 includes a rigid shell 201, a lattice structure 100, and an integral comfort layer 102 (which may be part of the lattice structure 100). FIG. 2C shows an example of protective equipment 10 that includes an integral shell 110, a lattice structure 100, and a foam pad 51. Although not shown in the drawings, the protective equipment 10 may include both the foam pad 51 and the integral comfort layer 102. The innermost surface of the lattice structure 100 may include provisions for attaching the foam pad 51 (e.g., similar to the attachment of the outer layer, including the rigid shell 201, which is discussed below). In certain embodiments, as shown in FIG. 2D, the protective equipment 10 includes an integral shell 110, a lattice structure 100, and an integral comfort layer 102. In some cases, there is an internal shell 103 disposed within the lattice structure 100 and adjacent to the integral comfort layer 102.

Figure 3A:
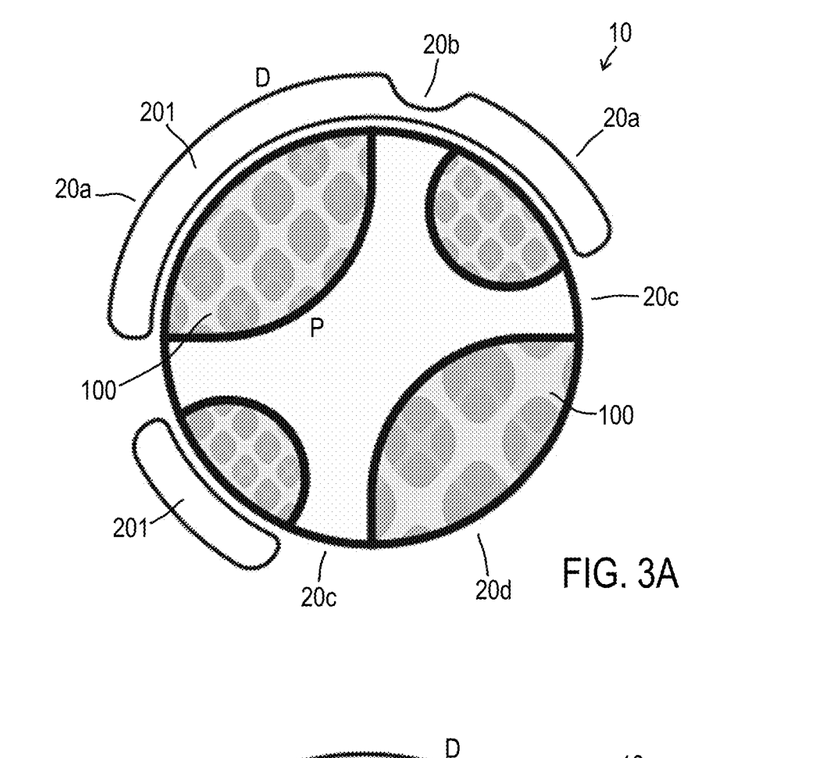
FIG. 3A is a schematic layout view of protective equipment according to certain embodiments of the present invention.
Figure 3B:
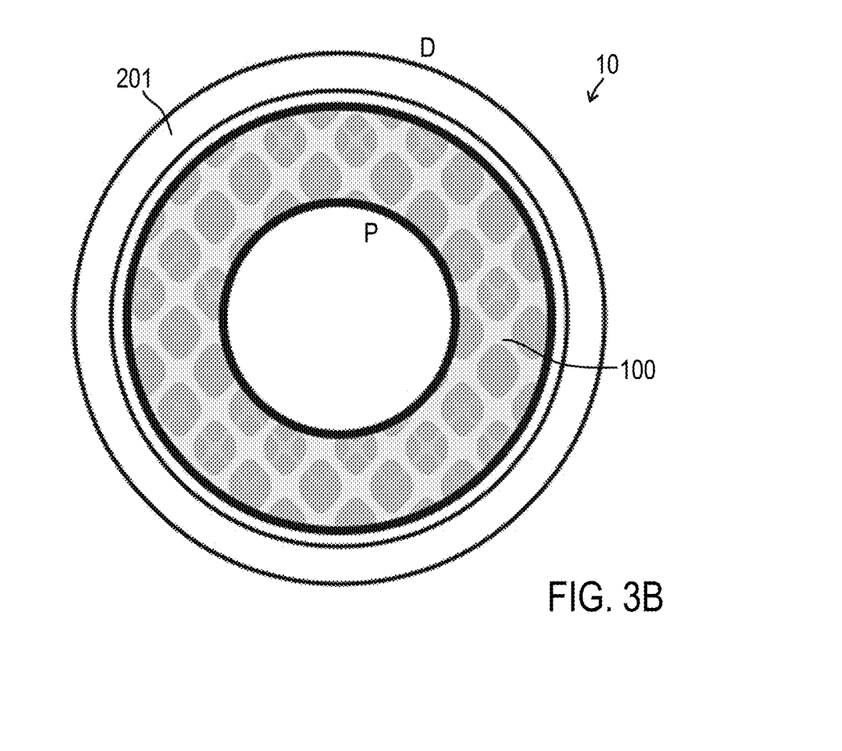
FIG. 3B is a schematic layout view of protective equipment according to certain embodiments of the present invention.

The protective equipment 10 may include a full coverage configuration where one or more layers (e.g., the lattice structure 100 and/or the rigid shell 201) are continuous layers on all surfaces of the protective equipment 10 (see FIG. 3B), or a partial coverage configuration where one or more layers (e.g., lattice structure 100 and/or the rigid shell 201) are positioned as layers for discrete areas of the protective equipment 10 (see FIG. 3A). Although FIGS. 3A and 3B illustrate particular examples where the lattice structure 100 and/or the rigid shell 201 are discontinuous or continuous, the protective equipment 10 may include any numbers of layers where one or more of the layers are discontinuous or continuous including, but not limited to, the layers illustrated in FIGS. 2A-2D. As shown in FIG. 3A, the protective equipment 10 may include first zones 20a including a layer of lattice structure 100 and the rigid shell 201, second zones 20b with a rigid shell 201 but no lattice structure 100, third zones 20c that include neither a rigid shell 201 nor a lattice structure 100, fourth zones 20d with lattice structure 100 but no rigid shell 201, or any other zone. Although FIG. 3A illustrates an example where the second zone 20b includes a reduced thickness for the rigid shell 201 as compared to zone 20a, in some examples, the rigid shell 201 in this zone may be consistent with the thickness of the rigid shell 201 in other zones or may be thicker than the rigid shell 201 in other zones.

Figure 4A:
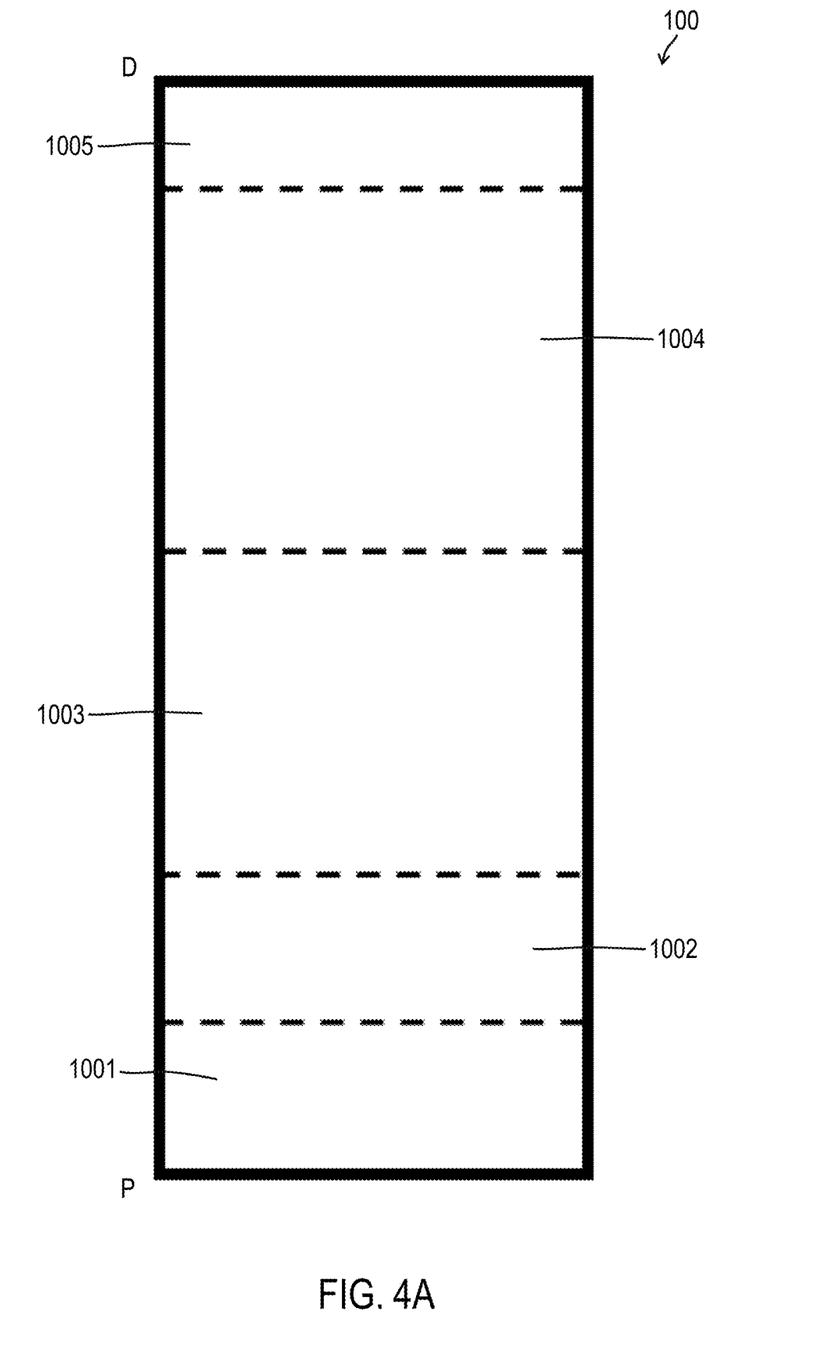
FIG. 4A is a cross-section view of a lattice structure for protective equipment according to certain embodiments of the present invention.

The lattice structure 100 may include any number of layers including, for example, a single layer, two layers (e.g., see FIGS. 1A-1C, 1F), three layers (e.g., see FIGS. 1D, 1E, and 1G), or any other appropriate number of layers. In some embodiments, as shown in FIG. 4A, the lattice structure 100 may include five layers. The lattice structure 100 may include a comfort fit layer 1001, a pressure distribution layer 1002, a linear energy absorption layer 1003, a rotational energy absorption layer 1004, and a load distribution layer 1005. The comfort fit layer 1001 may include an overall lower stiffness compared to other layers of the lattice structure 100 for multiple reasons including, for example, lower strut diameters. The comfort fit layer 1001 may be similar to the comfort fit layers described in the context of FIGS. 1A-1H and/or the integral comfort layer 102 described below. The pressure distribution layer 1002 may include an overall higher stiffness compared to other layers of the lattice structure 100 for multiple reasons including, for example, larger strut diameters and/or decreased overall porosity. The pressure distribution layer 1002 may be similar to the pressure distribution layers described in the context of FIGS. 1A-1H and/or the internal shell 103 described below. The linear energy absorption layer 1003 may include medium thickness struts (i.e., thicker than the struts of the comfort fit layer 1001 but thinner than the struts of the pressure distribution layer 1002). Moreover, the linear energy absorption layer 1003 may include a rate-dependent response based on the material property and/or geometry of the cell structure. The rotational energy absorption layer 1004 may include medium thickness struts (i.e., thicker than the struts of the comfort fit layer 1001 but thinner than the struts of the pressure distribution layer 1002). Moreover, the rotational energy absorption layer 1004 may include enhanced shearing properties and a rate-dependent response based on the material property and/or geometry of the cell structure. The load distribution layer 1005 may include an overall higher stiffness compared to other layers of the lattice structure 100 for multiple reasons including, for example, larger strut diameters and/or decreased overall porosity. The load distribution layer 1005 may be similar to the load distribution layers described in the context of FIGS. 1A-1H and/or the interface surface 109 described below.

Figure 4B:
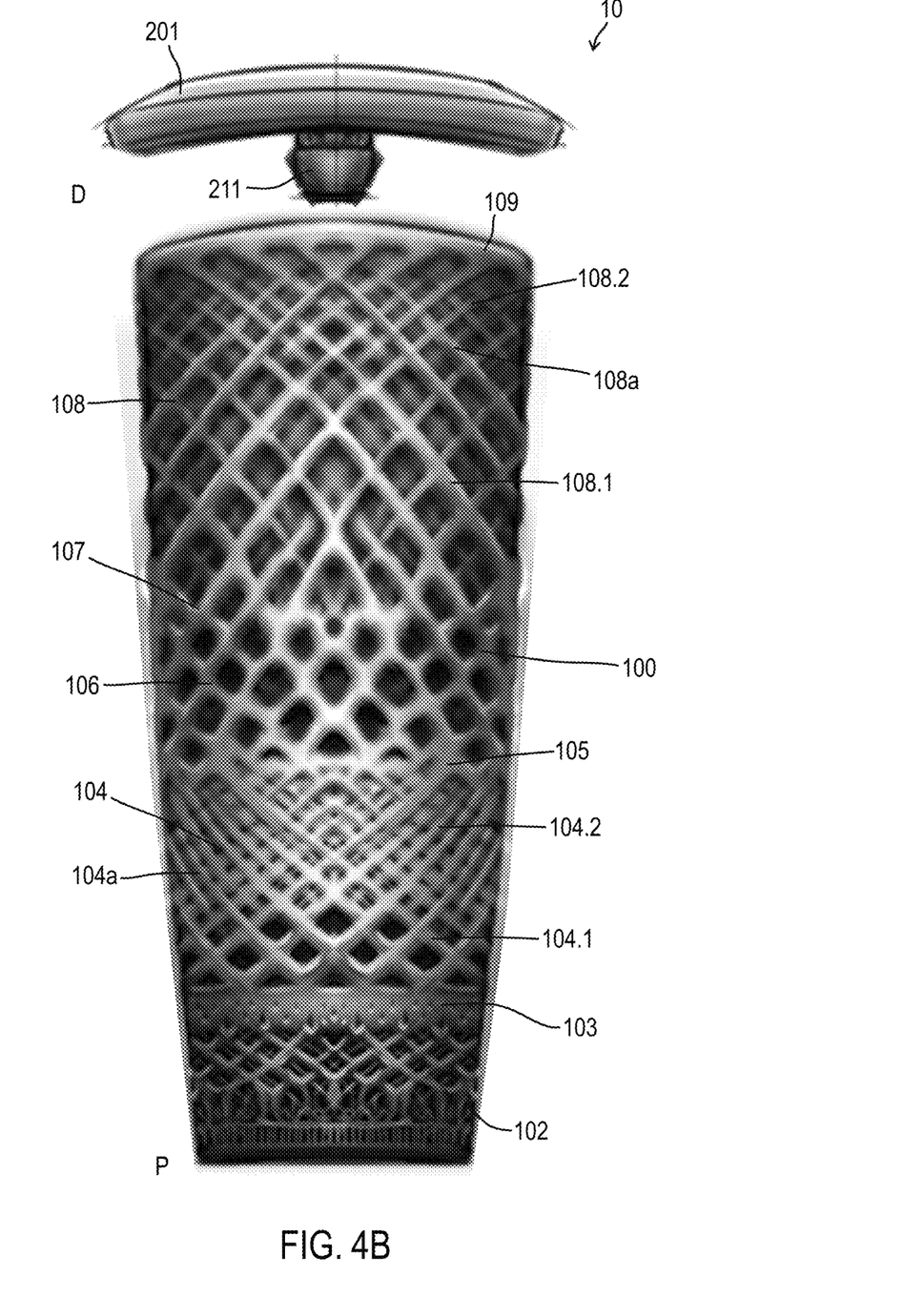
FIG. 4B is a cross-section view of protective equipment according to certain embodiments of the present invention.

FIG. 4B shows an example of a cross-section showing multiple layers of protective equipment 10. The protective equipment 10 may include an integral comfort layer 102 arranged as the closest layer to the user's skin where the integral comfort layer 102 may include very thin diameter struts, which allow the integral comfort layer 102 to adapt to the shape of the user's body. The integral comfort layer 102 may be isolated from the other portions of the lattice structure 100 by an internal shell 103. The internal shell 103 ensures that forces/energy that propagate through the various layers of the protective equipment 10 from the exterior of the protective equipment 10 are not directly transmitted into small areas of the integral comfort layer 102. The internal shell 103 has a significantly greater density and less flexibility than the integral comfort layer 102 such that forces/energy that reach the internal shell 103 are spread over the entire interface (or a large portion thereof) between the internal shell 103 and the integral comfort layer 102. The internal shell 103 is isolated from the skin of the user 1 by the integral comfort layer 102 to ensure that forces are not directly transferred from the internal shell 103 to the user 1.

The lattice structure 100, on the external side of the internal shell 103, may include a first internal layer 104 that includes medium diameter struts. The first internal layer 104 may be attached to at least a portion of the outer surface of the internal shell 103. As shown in FIG. 4B, the first internal layer 104 may include a lower density portion 104.1 adjacent to the internal shell 103 and a higher density portion 104.2 distal from the internal shell 103 such that the struts are arranged closer together in higher density portion 104.2 compared to lower density portion 104.1. The medium diameter struts of the first internal layer 104 have a larger average strut diameter than the struts of the integral comfort layer 102. The first internal layer 104 is designed to compress and absorb energy to reduce the force/energy transmitted toward the user. In some cases, the lower density portion 104.1 compresses more than the higher density portion 104.2. However, in some cases, the lower density portion 104.1 compresses less than the higher density portion 104.2.

On an exterior side of the first internal layer 104, the lattice structure 100 may include a second internal layer 106. The second internal layer 106 may be attached to at least a portion of the outer surface of the first internal layer 104. The second internal layer 106 may include large diameter struts. In some cases, the large diameter struts of the second internal layer 106 have a larger average strut diameter than the struts of the first internal layer 104 and are the largest diameter struts in any layer of the lattice structure 100.

The lattice structure 100, on the external side of the second internal layer 106, may include a third internal layer 108 that includes small diameter struts. The third internal layer 108 may be attached to at least a portion of the outer surface of the second internal layer 106. In some cases, the small diameter struts of the third internal layer 108 have a smaller average strut diameter than the struts of the first internal layer 104 but are larger in diameter compared to the struts of the integral comfort layer 102. As shown in FIG. 4B, the third internal layer 108 may include a lower density portion 108.1 adjacent to the second internal layer 106 and a higher density portion 108.2 adjacent to an interface surface 109 (and distal from the second internal layer 106) such that the struts are arranged closer together in higher density portion 108.2 compared to lower density portion 108.1.

The example shown in FIG. 4B illustrates relative thicknesses for each of the layers and/or portions of layers for one specific location within the protective equipment 10 (e.g., integral comfort layer 102, internal shell 103, lower density portion 104.1, higher density portion 104.2, second internal layer 106, lower density portion 108.1, higher density portion 108.2, interface surface 109, etc.). However, these relative thicknesses (and/or the overall thickness of the protective equipment 10) will be different for any given location within the protective equipment 10. Moreover, these relative thicknesses (and/or the overall thickness) will change based on multiple other factors, as described above.

In some embodiments, the lattice structure 100 is designed such that the second internal layer 106 and the third internal layer 108 can compress to absorb significant amounts of energy to reduce perceived impacts to the user 1. The lower density portion 108.1 of the third internal layer 108 may compress more than the higher density portion 108.2 and the second internal layer 106. However, the relative compression for each of these layers may change such that the third internal layer 108 may compress less than or an equal amount to the higher density portion 108.2 and/or the second internal layer 106.

The interface surface 109 is a relatively high density surface disposed at an outer extremity of the lattice structure 100. In some cases, the interface surface 109 is designed to facilitate attachment of external layer(s) (e.g., rigid shell 201) and may include attachment features (e.g., male or female attachment features). The interface surface 109 may also be designed as a continuous uninterrupted surface or may include at least one vent aperture (similar to vent holes 111 shown in FIGS. 5A-5B and 8). The interface surface 109 may be thinner than the internal shell 103, while in other cases, the interface surface 109 may be equal in thickness or thicker than the internal shell 103. In some cases, the interface surface 109 is designed as the exterior surface of the protective equipment 10 (i.e., the protective equipment 10 would include neither a rigid shell 201 nor an integral shell 110). Such a configuration would be appropriate for sports where violent impacts are less likely and would help reduce weight and optimize breathability of the protective equipment 10.

Some examples of protective equipment 10 include an outer layer (e.g., rigid shell 201 and/or integral shell 110), which functions to dissipate and distribute energy to reduce localized effects due to impacts such that point impacts are spread across large portions of the protective equipment 10 (similar to the function of the internal shell 103 described above). This function of the outer layer allows large percentages of the lattice structure 100 to compress and dissipate energy (i.e., energy dissipation is not limited to the localized area of the protective equipment 10 near the impact). The outer layer may be injection molded (or manufactured using any other appropriate method) as a separate component, may be produced by additive manufacturing separate from the lattice structure 100, and/or may be manufactured as an integral component of the lattice structure 100. Although not shown in the drawings, the protective equipment 10 may include the integral shell 110 as an outermost layer of the lattice structure 100 along with a rigid shell 201 attached to an outer surface if the integral shell 110. In other embodiments, the protective equipment 10 does not include any outer layer such that the interface surface 109 is the outermost surface of the protective equipment 10.

Although not illustrated in FIG. 4B, the lattice structure 100 may include integral shell 110 on an exterior surface of the interface surface 109, either in addition to or in lieu of the rigid shell 201. The integral shell 110 may include one or more dense layers of lattice for distributing and/or dissipating energy. In some examples, the integral shell 110 is approximately equal in density to the internal shell 103, while in other embodiments, the respective densities are not equal. In some embodiments, the internal shell 103 is thinner than the integral shell 110 such that the internal shell 103 has a lower overall stiffness.

As shown in FIG. 4B, there may be transitions between the various layers or portions of layers in the lattice structure 100. In some embodiments, the transitions between the various layers may be gradual and/or seamless. The internal shell 103 functions as a transition between the integral comfort layer 102 and first internal layer 104 and is a relatively abrupt transition. Within the first internal layer 104, there is a transition 104a that, in some embodiments, is a more gradual transition between the lower density portion 104.1 and the higher density portion 104.2. In other words, for some embodiments, the lower density portion 104.1 and the higher density portion 104.2 blend together such that identifying a specific location or border between these portions may be difficult. In some embodiments, the struts in higher density portion 104.2 (i) have a smaller diameter but (ii) are more closely arranged relative to one another compared to the struts in the lower density portion 104.1. Between the first internal layer 104 and the second internal layer 106, there may be a transition 105. In some embodiments, the transition 105 is relatively abrupt such that struts on the outer side of transition 105 have a larger diameter (in the second internal layer 106) and struts on the inner side of transition 105 are arranged in closer proximity to one another (in higher density portion 104.2 of the first internal layer 104).

In some embodiments, there is a transition 107 between the second internal layer 106 and the third internal layer 108, which is a relatively gradual transition. As shown in FIG. 4B, in some cases, the diameter of the struts in the third internal layer 108 gradually increase when approaching the second internal layer 106. In addition, the spacing between adjacent struts may decrease when moving from the third internal layer 108 to the second internal layer 106. Within the third internal layer 108, there is a transition 108a that, in some embodiments, is a more gradual transition between the lower density portion 108.1 and the higher density portion 108.2. In other words, for some embodiments, the lower density portion 108.1 and the higher density portion 108.2 blend together such that identifying a specific location or border between these portions may be difficult. In some embodiments, the struts in higher density portion 108.2 (i) have a smaller diameter but (ii) are more closed arranged relative to one another compared to the struts in the lower density portion 108.1.

Figure 5A:
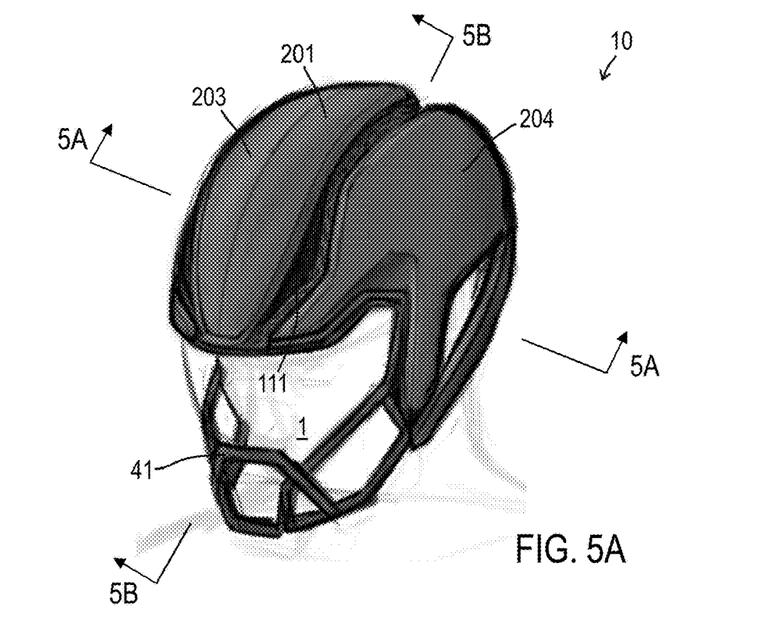
FIG. 5A is a front perspective view of protective equipment according to certain embodiments of the present invention.
Figure 5B:
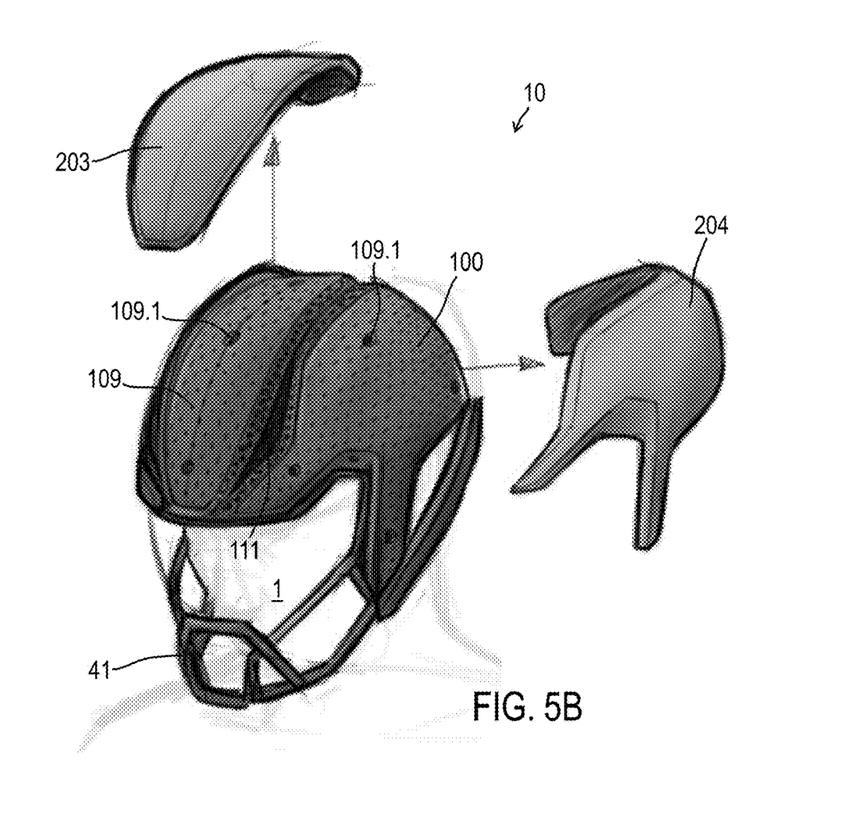
FIG. 5B is a front perspective partially exploded view of the protective equipment of FIG. 5A.
Figure 6A:
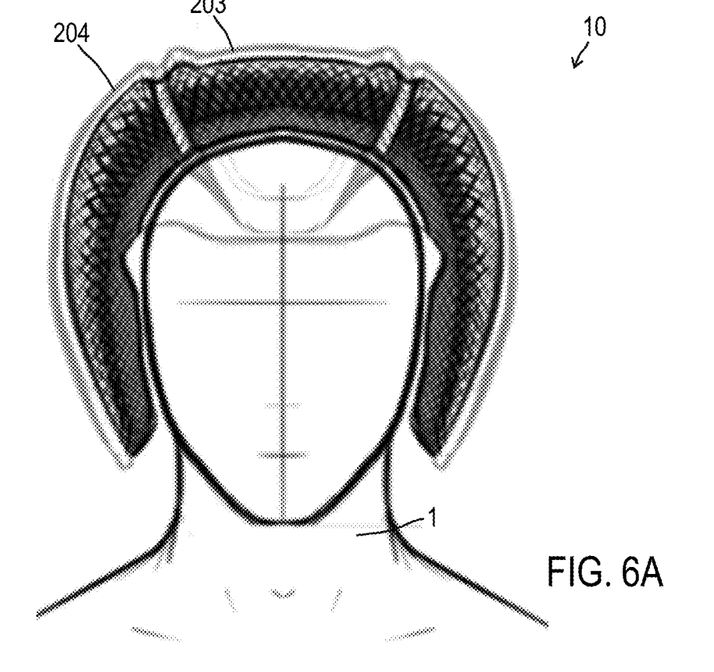
FIG. 6A is a front cross-section view of the protective equipment of FIG. 5A.
Figure 6B:
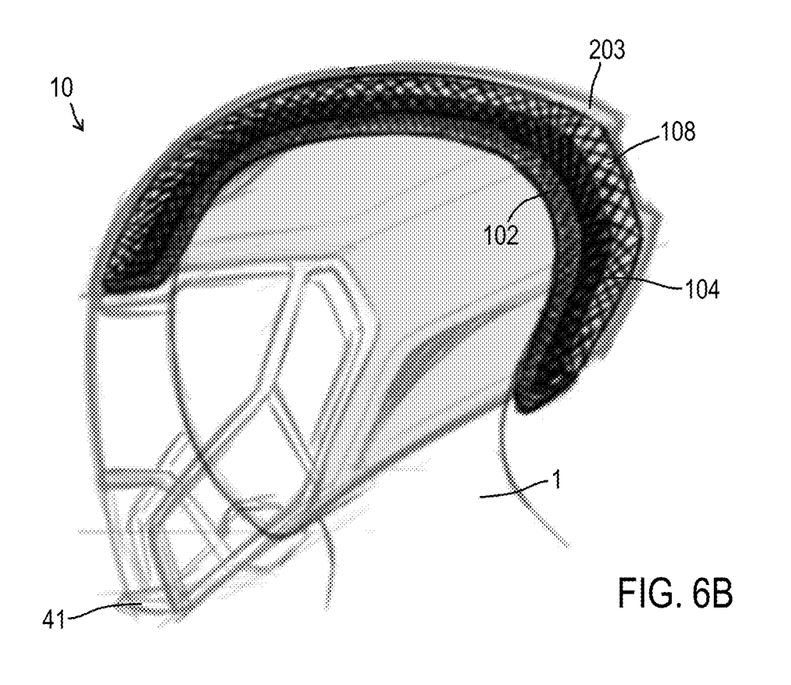
FIG. 6B is a side cross-section view of the protective equipment of FIG. 5A.

FIGS. 5A-6B illustrate examples where the protective equipment 10 is a helmet that includes a facemask 41. The cross-section views in FIGS. 6A and 6B illustrate that the thickness of the lattice structure 100 varies based on location within the protective equipment 10. For example, in some embodiments, as shown in FIG. 6B, the third internal layer 108 is thicker near the area corresponding to the occipital bone. The third internal layer 108, as described above, may be designed for significant amounts of compression and energy absorption. Such a design is optimized to reduce the effect of impacts to the back of the head of a user 1 when falling backward onto the ground. As shown in FIGS. 5A and 5B, the rigid shell 201 may include multiple parts including a center plate 203 and at least one side plate 204. The center plate 203 and the at least one side plate 204 may be arranged with gap(s) between the plates which allow for ventilation (described below) and for potential relative movement of the plates. For example, if a side plate 204 receives an impact, the side plate 204 can move toward the center plate 203 (temporarily reducing the gap) without transferring significant forces to the center plate 203. Decoupling the plates from one another and/or from the skin of the user 1 reduces the amount of energy transferred to the user 1.

As described above and as shown in FIGS. 5A and 5B, the protective equipment 10 may include at least one vent hole 111 to ensure sufficient airflow to the head of the user 1. In some embodiments, the first attachment portion 109.1 may provide supplemental ventilation when the rigid shell 201 is not attached. It should also be understood that smaller holes based on the geometry of the lattice structure 100 may affect ventilation and airflow through the protective equipment 10. The protective equipment 10 may be designed as modular multifunctional equipment. For example, a helmet (as shown in FIGS. 5A-6B) may be optimized for full contact football when the facemask 41 and the rigid shell 201 are installed. To prepare for non-contact football (e.g., touch football, flag football, or 7 on 7 football), the user 1 could uninstall the facemask 41 and the rigid shell 201. In other embodiments, the protective equipment 10 may include the integral shell 110 as an outermost layer of the lattice structure 100 and the integral shell 110 may include at least one attachment portion (similar to first attachment portions 109.1) to allow a modular attachment of the rigid shell 201 on an outer surface of the integral shell 110. The rigid shell 201, when combined with the integral shell 110 may provide auxiliary protection for concussions and/or may be appropriate for individuals with a history of concussions.

Figure 7A:
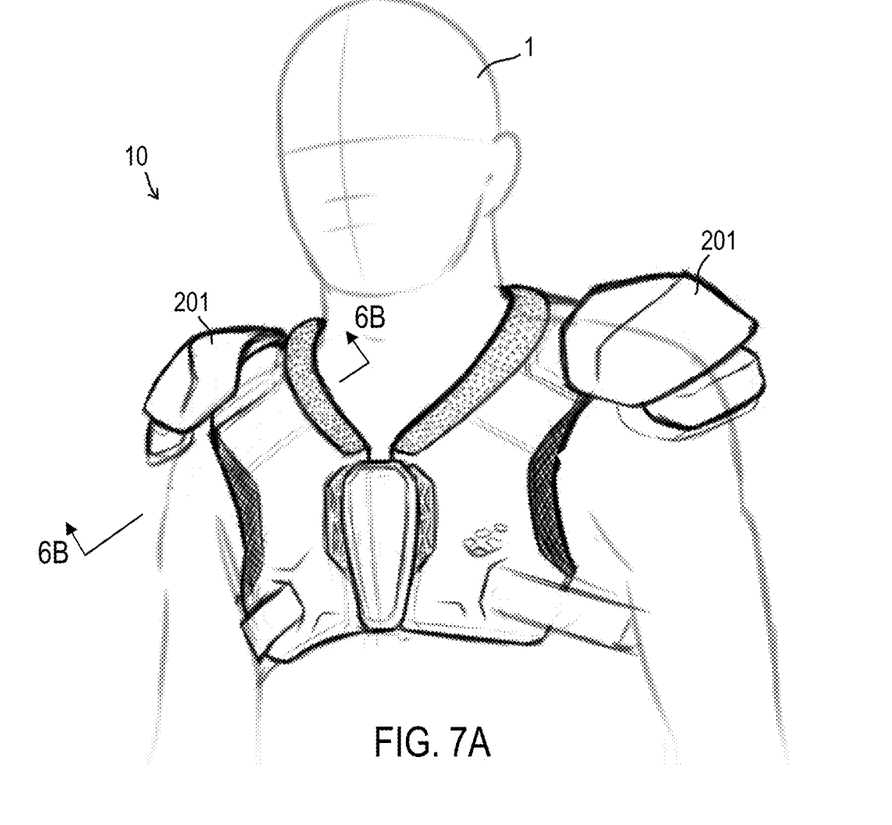
FIG. 7A is a front perspective view of protective equipment according to certain embodiments of the present invention.
Figure 7B:
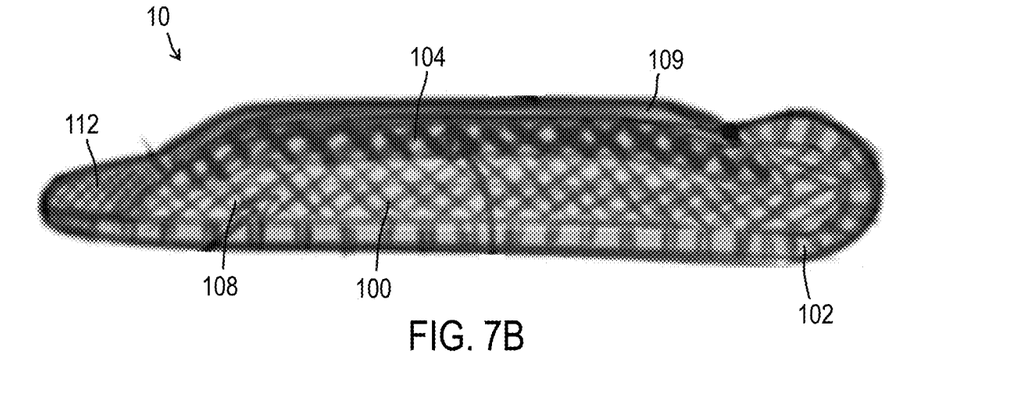
FIG. 7B is a cross-section view of the protective equipment of FIG. 7A.

FIGS. 7A and 7B show embodiments where the protective equipment 10 is shoulder pads. The shoulder pads may include at least one outer layer (e.g., integral shell 110 or rigid shell 201) where the outer layer(s) cover at least some portions of the protective equipment 10. FIG. 7B shows a cross-section of the shoulder pad in the chest area of the user 1 (when worn). In some embodiments, as shown in FIG. 7B, the chest area of the shoulder pad includes a lattice structure 100 where the interface surface 109 is the outermost layer. In addition to the interface surface 109, the lattice structure 100 may also include an integral comfort layer 102, a third internal layer 108, and a first internal layer 104. The integral comfort layer 102 may be arranged as the closest layer to user's skin. Moreover, as shown in FIG. 7B, on the medial side of the portion of protective equipment 10, the integral comfort layer 102 may wrap around the edge of the shoulder pad to meet the interface surface 109 on the outermost surface of the protective equipment 10. Arranging the integral comfort layer 102 on this edge of the protective equipment 10 ensures a compliant and comfortable interface with the neck of the user 1. The lateral edge of the portion of protective equipment 10 illustrated in FIG. 7B (opposite end from the medial edge) may include a flexible layer 112. The flexible layer 112 is flexible and more capable of bending compared to the other layers of the protective equipment 10. The flexible layer 112 is located on the lateral side of the shoulder pads (protective equipment 10) to ensure arm and chest movements are not constrained. The flexible layer 112 may be attached to portions of at least one of the integral comfort layer 102, the third internal layer 108, the first internal layer 104, and the interface surface 109. In some embodiments, the shoulder pads may include portions with components and/or layers similar to those discussed above and/or illustrated in FIGS. 1A-6B.

Figure 8:
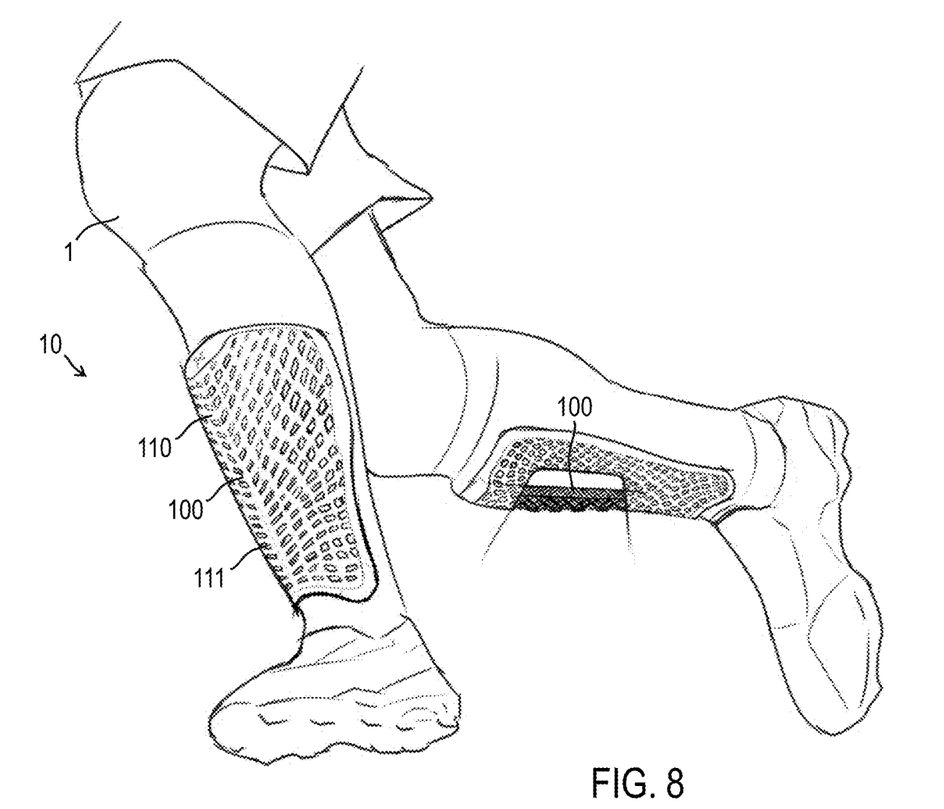
FIG. 8 is a front perspective view of protective equipment according to certain embodiments of the present invention.

FIG. 8 shows embodiments where the protective equipment 10 is a shin guard. The shin guard (protective equipment 10) may include a lattice structure 100 that includes an integral shell 110 with a plurality of vent holes 111 to ensure sufficient airflow. In a region corresponding to the tibia, the shin guard may include increased thickness of one or more internal layers (e.g., the first internal layer 104, the second internal layer 106, and/or the third internal layer 108). In some embodiments, the shin guard may include portions with components and/or layers similar to those discussed above and/or illustrated in FIGS. 1A-7B.

Figure 9A:
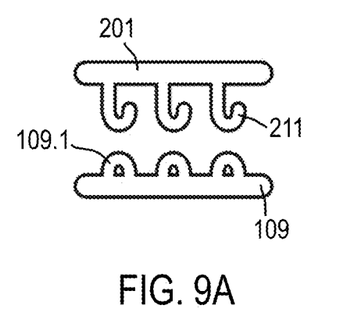
FIGS. 9A, 9B, and 9C are schematic views of attachment portions between a rigid shell portion and protective equipment according to certain embodiments of the present invention.
Figure 9B:
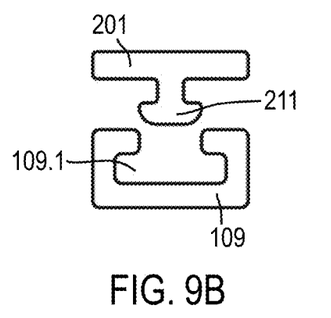
Figure 9C:
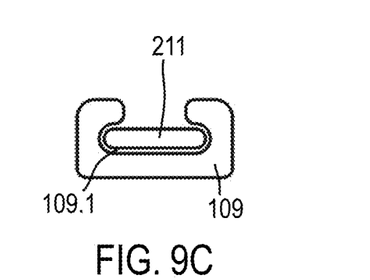

When the protective equipment 10 is designed to include an outer layer (e.g., rigid shell 201 or integral shell 110), the outer layer may be integrally manufactured as part of the lattice structure 100 (e.g., integral shell 110), may be a separately manufactured but permanent component that is attached to the lattice structure 100, or may be removably attached (i.e., modular). The parts may be joined chemically and/or mechanically. Chemical joining includes adhesive, bonding agents, or any other appropriate substance. For a mechanical bond, the interface surface 109 may include a first attachment portion 109.1. In some embodiments, when the rigid shell 201 includes a second attachment portion 211 (which may include a cylindrical post with a tapered dome head, as shown in FIG. 4B), the first attachment portion 109.1 includes a corresponding hole/receptacle (see FIG. 4B). FIGS. 9A-9C show exemplary configurations for attaching the outer layer to the lattice structure 100. The mechanical attachment may include hook and loop such that the first attachment portion 109.1 is at least one loop and the second attachment portion 211 is at least one hook (see FIG. 9A). In some embodiments, the mechanical attachment may include a snap post such that the first attachment portion 109.1 is at least one receptacle and the second attachment portion 211 is at least one post (see FIG. 9B). In some embodiments, the mechanical attachment may include a slot and rail such that the first attachment portion 109.1 is at least one slot and the second attachment portion 211 is at least one rail (see FIG. 9C). Although the drawings show embodiments where the lattice structure 100 includes at least one female portion and the rigid shell 201 includes at least one male portion, the arrangement may reversed or partially reversed such that the lattice structure 100 includes at least one male portion and the rigid shell 201 includes at least one female portion. In addition to the structural functions described above, the removable and modular outer layer may be designed for aesthetic purposes. For example, the outer layer (e.g., rigid shell 201 or a portion thereof) may include colors, team or organization emblem/logo, player number, or any other appropriate information. To minimize the forces transferred to the user 1, in embodiments where the rigid shell 201 is modular/removable, the rigid shell 201 can be designed to fail (e.g., plastic deformation) above a certain threshold force or loading condition such that the rigid shell 201 (or a portion thereof) can be replaced.

In some embodiments, the protective equipment 10 may be custom fit to an individual user 1. For example, one or more measurements may be used to create and custom fit the protective equipment 10 for a user. In some cases, a three-dimensional scan of the appropriate body part of the user 1 may be analyzed prior to manufacturing the protective equipment 10.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. An article of protective equipment for protecting a body part of a user, the article of protective equipment comprising:
   an innermost surface positioned closest to the body part of the user when the article of protective equipment is worn; and
   a lattice structure comprising a plurality of struts forming volumetric structures, the lattice structure comprising:
      a plurality of internal lattice layers, each internal lattice layer having at least one different property,
      wherein the plurality of internal lattice layers comprises at least one internal lattice layer comprising a first set of struts, each strut of the first set of struts having a first diameter such that the at least one internal lattice layer is capable of compressing more than at least one other internal lattice layer in response to an impact to the article of protective equipment,
      wherein the at least one other internal lattice layer comprises a second set of struts, each strut of the second set of struts having a second diameter that is different than the first diameter, and wherein one of the at least one internal lattice layer or the at least one other internal lattice layer is positioned closer to the innermost surface than the other of the at least one internal lattice layer or the at least one other internal lattice layer.

2. The article of protective equipment of claim 1, wherein the lattice structure comprises an integral comfort lattice layer disposed as a portion of the lattice structure that is closest to the body part when worn, wherein the integral comfort lattice layer comprises a third set of struts having a third diameter, wherein the first diameter is greater than the third diameter.

3. The article of protective equipment of claim 2, wherein the lattice structure comprises an internal shell disposed on an outer surface of at least a portion of the integral comfort lattice layer.

4. The article of protective equipment of claim 3, wherein the lattice structure comprises a first internal lattice layer attached to at least a portion of an outer surface of the internal shell, a second internal lattice layer attached to at least a portion of an outer surface of the first internal lattice layer, and a third internal lattice layer attached to at least a portion of an outer surface of the second internal lattice layer.

5. The article of protective equipment of claim 4, wherein the first internal lattice layer comprises a portion disposed adjacent to the internal shell having larger diameter struts compared to a portion distal from the internal shell.

6. The article of protective equipment of claim 1, wherein the at least one internal lattice layer comprises a first density, the at least one other internal lattice layer comprises a second density, and the first density is different than the second density.

7. The article of protective equipment of claim 1, further comprising at least one foam pad disposed on a proximal side of the lattice structure.

8. The article of protective equipment of claim 1, wherein an outermost surface of the lattice structure comprises at least one first attachment portion for attaching a rigid shell.

9. The article of protective equipment of claim 8, wherein the rigid shell is removably attached to the lattice structure.

10. The article of protective equipment of claim 8, wherein the rigid shell comprises multiple discontinuous portions.

11. The article of protective equipment of claim 1, wherein the article of protective equipment comprises a helmet, wherein a thickness of at least one of the internal lattice layers is increased in an area corresponding to an occipital bone of the user when worn.

12. The article of protective equipment of claim 1, wherein the plurality of internal lattice layers comprise at least one linear energy absorption lattice layer and at least one rotational energy absorption layer.

13. The article of protective equipment of claim 1, wherein the lattice structure comprises:
- a first set of volumetric structures disposed in a first orientation such that the first set of volumetric structures is configured to deflect a first force from a first direction to a second direction; and
- a second set of volumetric structures adjacent to the first set of volumetric structures, wherein the second set of volumetric structures is disposed in a second orientation different from the first orientation such that the second set of volumetric structures is configured to deflect a second force from a third direction to a fourth direction.

* * * * *